United States Patent
Fisher

[15] 3,649,313
[45] Mar. 14, 1972

[54] REFRACTORY MORTAR

[72] Inventor: Robert E. Fisher, Clarendon Hills, Ill.

[73] Assignee: Combustion Engineering, Inc., Windsor, Conn.

[22] Filed: Dec. 17, 1969

[21] Appl. No.: 885,988

[52] U.S. Cl. ................................106/56, 106/65, 106/85
[51] Int. Cl. .............................................C04b 35/52
[58] Field of Search ........................106/56, 65, 85

[56] References Cited

UNITED STATES PATENTS

| | | |
|---|---|---|
| 2,660,533 | 11/1953 | West et al. ..................106/56 |
| 3,179,526 | 4/1965 | Dolph ..........................106/65 |
| 3,298,839 | 1/1967 | Troell ..........................106/65 |
| 3,303,034 | 2/1967 | Troell et al. ................106/65 |
| 3,379,544 | 4/1968 | Burhans et al. ............106/65 |

Primary Examiner—James E. Poer
Attorney—Carlton F. Bryant, Eldon H. Luther, Robert L. Olson, John F. Carney, Richard H. Berneike, Edward L. Kochey, Jr. and Lawrence P. Kessler

[57] ABSTRACT

A refractory mortar for refractory brick in metallurgical process ladles containing materials with a high alumina content, graphite, a phosphate binder, methyl cellulose and water.

4 Claims, No Drawings

3,649,313

REFRACTORY MORTAR

BACKGROUND OF THE INVENTION

The requirements of refractory linings for steel plant ladles presents a real problem because of the extreme severity of the environment and because failure usually results in a contaminated steel product. Copending patent application Ser. No. 760,094 filed Sept. 16, 1968, discloses a refractory material which is particularly well suited for ladle linings. This refractory material has a high resistance to attack by both the molten slag and the molten metal. It also has a high resistance to thermal shock and a low thermal conductivity. This refractory may either be applied as a monolithic lining or it may be formed into brick and applied in the conventional manner which involves the use of a mortar. In order to obtain a satisfactory bricked lining, it is necessary that the mortar form a firm bond and also be resistant to attack and thermal shock.

SUMMARY OF THE INVENTION

An object of the present invention is to provide an air-setting refractory mortar particularly adapted for setting refractory brick in metallurgical process ladles or the like. The mortar is particularly useful with high-alumina brick or other high-quality brick. This mortar has a low angle of contact with the brick and thus adheres readily. In contrast, it has a high angle of contact with molten metal and slag and thus is resistant to penetration. The mortar dries readily and adheres tightly, forming a crack-free, noncurling joint. The mortar composition basically consists of fine alumina-containing refractory particles together with graphite and a binder.

DESCRIPTION OF THE PREFERRED EMBODIMENT

The refractory mortar of the present invention employs a base of a calcined refractory material with a high-alumina content, such as bauxite or alumina, together with graphite, a phosphate binder, methyl cellulose, and water. The formulation of the mortar may vary such as within the following ranges:

|  | Weight % |
| --- | --- |
| Calcined bauxite 200 mesh | 0.0–70.0 |
| Calcined alumina 200 mesh | 0.0–60.0 |
| Norwegian graphite | 2.0–20.0 |
| Aluminum phosphate | 1.0–20.0 |
| Water | 5.0–15.0 |
| Methyl cellulose | 0.10–1.00 |

The percentage of bauxite plus alumina (the alumina-containing refractory particles) is between 50.0 and 80.0 percent.
A typical and preferred composition of the mortar is as follows:

|  | Weight % |
| --- | --- |
| Calcined bauxite 200 mesh | 65.8 |
| Calcined alumina 200 mesh | 5.5 |
| Norwegian graphite | 4.5 |
| Aluminum phosphate | 14.0 |
| Water | 10.0 |
| Methyl cellulose | 0.2 |

The calcined bauxite is produced by calcining natural bauxite, which is an alumina hydrate, at a temperature between 2,800° and 3,100° F., which is sufficiently high to eliminate the shrinkage. The calcined alumina is obtained by calcining relatively pure aluminum oxide to produce a dense, low-porosity, stable product. Both the calcined bauxite and calcined alumina are crushed and pulverized so as to pass through 200-mesh U.S. Standard sieve. It is possible to use either all calcined bauxite or all calcined alumina in place of the mixture of the two materials. The calcined bauxite is lower in cost but it is also less refractory than calcined alumina. However, calcined bauxite particles have a rougher surface and tend to react with the matrix, fine particles and glassy phase, to increase the refractoriness and corrosion resistance at liquid metal temperatures. The calcined alumina gradually reacts with the matrix material and forms a more refractory matrix which provides high load-bearing properties at elevated temperatures and greater resistance to slag penetration. Also contemplated within the scope of the present invention is the substitution for the calcined bauxite and alumina of properly sized calcined flint clay or calcined kaolin, both of which are of relatively high (in excess of 40 percent) alumina content. However, the resulting mortar will be less refractory than the preferred composition.

The preferred graphite for use in the invention is Norwegian graphite which is a natural material found in Norway. The graphite-bearing ore is crushed and the graphite separated from the gangue by flotation, dried and sized as follows:

| U.S. Std. Sieve | Percent retained |
| --- | --- |
| 20 | 0.0 |
| 30 | 0.1 |
| 40 | 0.6 |
| 50 | 5.0 |
| 70 | 13.6 |
| 100 | 21.2 |
| 140 | 21.6 |
| 200 | 17.4 |
| 270 | 5.0 |
| Through 270 | 15.2 |

The carbon content of the resulting material is approximately 90 percent. The Norwegian graphite is preferred because of the large flake structure and because it is relatively soft and resistant to oxidation in contrast with graphites from other locations. The phosphate binder may be phosphoric acid but aluminum phosphate is preferred. The methyl cellulose in the composition is for the purpose of improving the water retention properties of the mortar. Methyl cellulose is derived by treating cellulose fibers, such as cotton linters or woodpulp, with a caustic soda solution to produce alkali cellulose which is then treated with methyl compounds to yield the methyl ether of cellulose. The fibrous reaction product is purified and then ground to a fine powder.

Typical chemical analyses of the mortar of the present invention after drying and after calcining are as follows:

|  | Dried Mortar, –% | Calcined Mortar, % |
| --- | --- | --- |
| Silica | 4.01 | 6.45 |
| Alumina | 69.34 | 89.32 |
| Ferric Oxide | 0.97 | 1.25 |
| Titania | 2.31 | 2.98 |
| Calcium Oxide | Trace | Trace |
| Magnesium Oxide | Trace | Trace |
| Alkalies | Trace | Trace |
| Carbon | 7.90 | — |
| Loss on Ignition | 14.47 | — |

The bonding strengths after heating the brick and the mortar to various temperatures are as follows:

| Temperature of Test | Modulus of Rupture |
| --- | --- |
| 230° F. (110° C.) | 800 p.s.i. |
| 1,500° F. (816° C.) | 300 p.s.i. |
| 2,000° F. (1,093° C.) | 400 p.s.i. |
| 2,550° F. (1,400° C.) | 300 p.s.i. |
| 3,000° F. (1,650° C.) | 800 p.s.i. |

The mortar has excellent resistance to carbon monoxide disintegration. It is unaffected after 1,250 hours exposure to carbon monoxide at 900° F. after being prefired at 1,000° F.

according to the A.S.T.M. C288–62 test method. No material fusion or shrinkage is evidence after A.S.T.M. refractoriness test C199–45 at 2,912° F. Also, the slag resistance is high as there is zero penetration of a mortared joint after 5 hours exposure to blast furnace slag at 2,912° F. This lack of penetration by the slag as well as by the molten metal is due to the very high angle of contact and the resulting nonwettability of the brick which is coated with the mortar.

The amount of water which is added to the mortar is sufficient to make a mortar of a stiff pancake batter consistency. The resulting mixture has excellent suspension of the finely divided calcined bauxite and alumina or other refractory particles. The ladle lining brick to which the mortar is applied and particularly the brick referred to in the prior-mentioned U.S. Pat. application Ser. No. 760,094 has sufficient porosity (10–15 percent) and the mortar has a sufficiently low surface tension such that the brick is readily wetted by the mortar allowing a portion of the moisture to be absorbed by the brick. This results in a firm joint so that the brick will not slip. If there is too little water in the mortar, it will be rapidly absorbed by the brick and the mortar will be sandy and dry before the next brick is put into place resulting in a poor bond. If there is too much water, the bricks will slip out of place.

It will be understood that the foregoing description of the invention has been by way of example only and that the scope of the invention is as expressed in the following claims.

I claim:

1. A refractory mortar consisting essentially of 50–80 weight percent alumina-containing refractory particles, 2–20 weight percent graphite, 1–20 weight percent phosphate binder selected from the group consisting of aluminum phosphate and phosphoric acid, 5–15 weight percent water, and 0.1–1.0 weight percent methyl cellulose.

2. A refractory mortar as recited in claim 1 wherein said refractory particles consist essentially of bauxite and alumina, said bauxite comprising up to 70 weight percent of said mortar and said alumina comprising up to 60 weight percent of said mortar.

3. A refractory mortar as recited in claim 2 wherein said refractory particle size is minus 200 mesh.

4. A refractory mortar as recited in claim 2 wherein said mortar contains about 65.8 weight percent calcined bauxite, 5.5 weight percent calcined alumina, 4.5 weight percent graphite, 14.0 weight percent aluminum phosphate, 10.0 weight percent water, and 0.2 weight percent methyl cellulose and wherein said calcined bauxite and calcined alumina are minus 200 mesh.

* * * * *